United States Patent
Ohkubo et al.

(10) Patent No.: US 8,525,863 B2
(45) Date of Patent: Sep. 3, 2013

(54) OPTICAL SCANNING DEVICE AND IMAGE FORMING APPARATUS

(75) Inventors: Kenzo Ohkubo, Osaka (JP); Nobuhiro Shirai, Osaka (JP); Takasumi Wada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/160,578

(22) Filed: Jun. 15, 2011

(65) Prior Publication Data

US 2011/0310211 A1 Dec. 22, 2011

(30) Foreign Application Priority Data

Jun. 17, 2010 (JP) ................................. 2010-138084

(51) Int. Cl.
*B41J 15/14* (2006.01)
*B41J 27/00* (2006.01)

(52) U.S. Cl.
USPC .......................................... 347/241; 347/256

(58) Field of Classification Search
USPC ................. 347/236, 237, 241–244, 246, 247, 347/256–261
See application file for complete search history.

(56) References Cited

U.S. PATENT DOCUMENTS 5,801,746 A * 9/1998 Yamaguchi et al. .......... 347/259
5,903,379 A 5/1999 Kamikubo
2006/0192968 A1 * 8/2006 Farrant et al. ................. 356/445
2007/0285491 A1 12/2007 Kishimoto
2009/0324292 A1 12/2009 Oda

FOREIGN PATENT DOCUMENTS

| CN | 101086643 A | 12/2007 |
|----|-------------|---------|
| CN | 101614983 A | 12/2009 |
| JP | 09-274134 A | 10/1997 |
| JP | 2000-187175 A | 7/2000 |
| JP | 2002-014294 A | 1/2002 |
| JP | 2005-084565 A | 3/2005 |
| JP | 2007-233137 A | 9/2007 |
| JP | 2007233137 A * | 9/2007 |
| JP | 2010-002866 A | 1/2010 |

* cited by examiner

*Primary Examiner* — Hai C Pham
(74) *Attorney, Agent, or Firm* — Renner, Otto, Boisselle & Sklar, LLP

(57) ABSTRACT

An optical scanning device includes an enclosure having a plurality of windows covered with transparent members. The enclosure houses a plurality of light sources, a scanning portion, optical elements and a light amount attenuation portion. The scanning portion deflects each of a plurality of light beams emitted from a plurality of light sources at a constant angular speed in a main scanning direction. The optical elements constitute respective light paths from the scanning portion to the windows for the plurality of light beams, respectively. The light amount attenuation portion attenuates light amount in a light path of a first light source among the plurality of light sources in a downstream side of the position where a light beam emitted from a second light source enters as stray light. The drive portion drives the first light source so as to compensate for light amount attenuated by the light amount attenuation portion.

4 Claims, 9 Drawing Sheets

OPTICAL SCANNING DEVICE AND IMAGE FORMING APPARATUS

CROSS REFERENCE

This Nonprovisional application claims priority under 35 U.S.C. §119(a) on patent application No. 2010-138084 filed in Japan on Jun. 17, 2010, the entire contents of which are hereby incorporated by reference.

BACKGROUND OF THE INVENTION

The present invention relates to an optical scanning device including optical elements such as mirrors and lenses that constitute respective light paths for light beams emitted from a plurality of light sources, and to an electrophotography type image forming apparatus such as a printer including a plurality of latent image carriers that are exposed to the light from the optical scanning device.

The image forming apparatus that performs an electrophotographic image formation process is equipped with the optical scanning device that scans and exposes a photoconductor as a latent image carrier to be scanned with image light. The optical scanning device includes a light source, a scanning portion, and optical elements. The light source emits the image light modulated by image data. The scanning portion scans the photoconductor with the image light as a light beam in a main scanning direction. The optical elements include lenses and mirrors. The optical scanning device is housed in a light blocking enclosure for preventing influence of external light. The image light is distributed to the photoconductor through a window formed in a part of the enclosure.

Some of such optical scanning devices include a plurality of light sources. For instance, an optical scanning device that is used for a color image forming apparatus includes at least four light sources for emitting yellow, magenta, cyan, and black color image light beams. The optical scanning device that is used for the color image forming apparatus forms respective light paths for leading light beams emitted from the four light sources to four photoconductors of the color image forming apparatus, respectively. In order to reduce the number of components for reducing size and cost, the light beams emitted from four light sources are scanned by a single scanning portion.

However, in order to deflect a plurality of image light beams by a single scanning portion, the image light beams must be close to each other. Therefore, an image light beam may be reflected by an inner surface of the enclosure or a component to be stray light entering the light path of another image light. For instance, if magenta stray light enters the light path of yellow image light, the magenta stray light is distributed together with the yellow image light to the photoconductor so that undesired exposure is performed. As a result, a yellow image cannot be written correctly on the photoconductor.

For this reason, there is a conventional optical scanning device, as disclosed in JP-A-H09-274134 for example, in which a flat plate disposed at periphery of a polygon mirror as the scanning portion is tilted so that an image light beam reflected by the flat plate does not enter the light path of another image light beam.

However, stray light is generated also in other parts than the flat plate disposed at periphery of the polygon mirror. Therefore, the structure described in JP-A-H09-274134 cannot securely prevent stray light from entering the light path of another image light.

In addition, in order to prevent generation of stray light, it is necessary to specify a part generating stray light so as to stick a low reflection member to the part generating stray light or to adjust the angle. However, it is not easy to specify the part generating stray light in the optical scanning device equipped with a single scanning portion, because a plurality of image light beams are deflected at the same timing.

An object of the present invention is to provide an optical scanning device and an image forming apparatus that can easily and securely prevent unnecessary exposure to stray light without necessity of specifying a part generating stray light or an adjustment with respect to the part generating stray light, by increasing light amount of the image light that is affected by the stray light and by decreasing light amount in the light path after stray light enter the same.

SUMMARY OF THE INVENTION

The device of the present invention includes an enclosure, a plurality of light sources, a scanning portion, optical elements, a light amount attenuation portion, and a drive portion. The enclosure has a plurality of windows covered with transparent members. A plurality of light sources are housed in the enclosure together with the scanning portion, the optical element, and the light amount attenuation portion. The scanning portion deflects each of the plurality of light beams emitted from the plurality of light sources at a constant angular speed in a main scanning direction. The optical elements constitute respective light paths from the scanning portion to a plurality of windows for the plurality of light beams, respectively. The light amount attenuation portion attenuates light amount in a light path of a first light source among the plurality of light sources in a downstream side of a position where a light beam emitted from a second light source enters as stray light. The drive portion drives the first light source so as to compensate for light amount attenuated by the light amount attenuation portion.

DETAILED DESCRIPTION OF THE INVENTION

Hereinafter, an image forming apparatus equipped with a charging device according to an embodiment of the present invention will be exemplified and described.

Figure 1:
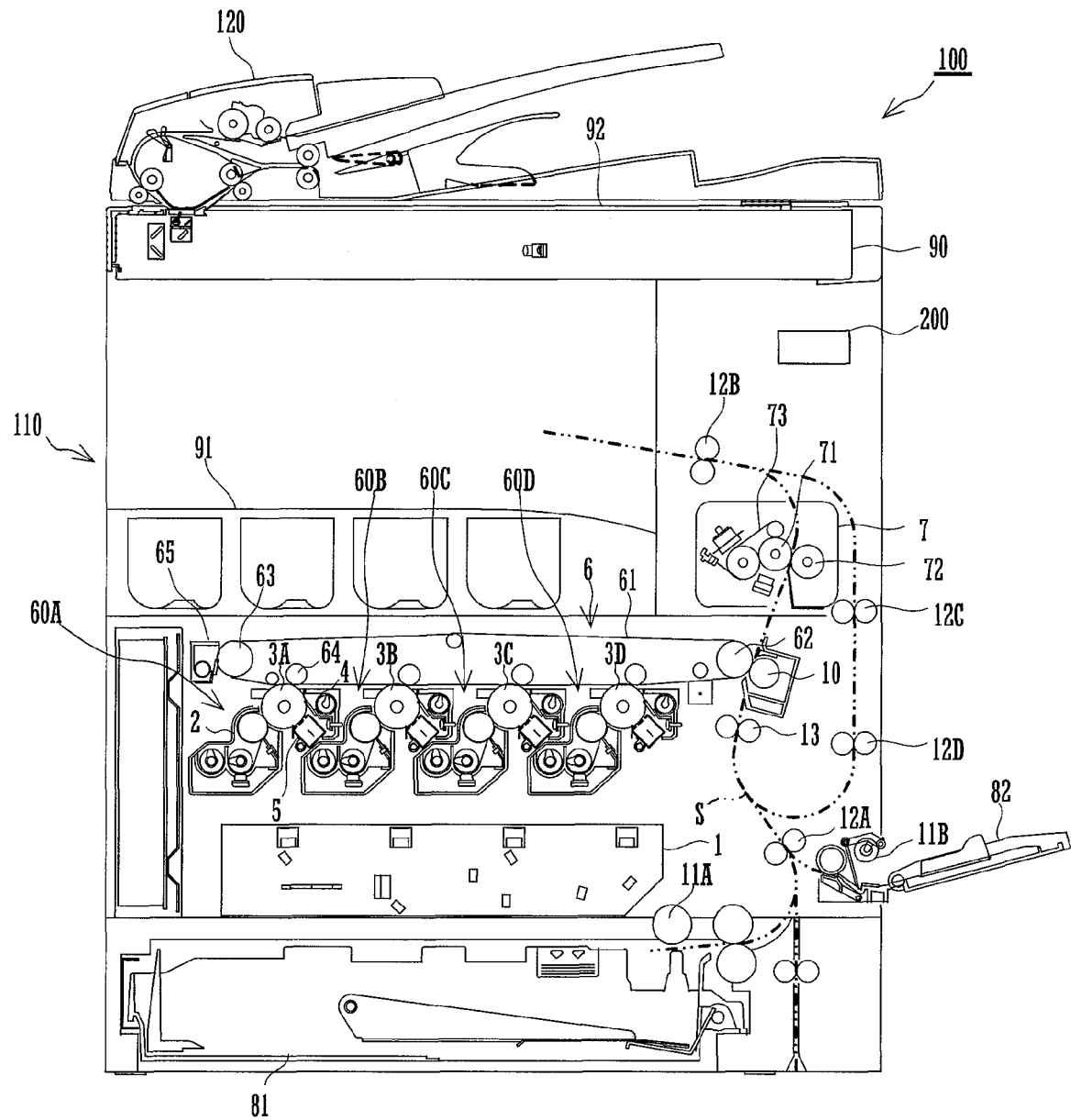
FIG. 1 is a schematic diagram of an image forming apparatus equipped with an optical scanning device according to an embodiment of the present invention.

As illustrated in FIG. 1, an image forming apparatus 100 equipped with a document feeder 120 according to an embodiment of the present invention forms a multi-colored or single colored image on a predetermined sheet (recording sheet) in accordance with image data. On the upper part of an apparatus main body 110, there is disposed an image reading portion 90. The document feeder 120 is attached to the upper side of the image reading portion 90. The automatic document feeder 120 automatically feeds document sheets. The document feeder 120 is pivoted at the rear edge part, so that an upper part of the image reading portion 90 can be opened and closed.

The apparatus main body 110 includes image formation portions 60A to 60D, an optical scanning device 1, an intermediate transfer belt unit 6, a fixing unit 7, a paper feed cassette 81, a copy receiving tray 91, and the like. The image formation portions 60A to 60D form toner images of yellow, magenta, cyan, and black colors, respectively. The image formation portion 60A includes a developing device 2, a photoconductor drum 3A, a cleaner unit 4, and a charging device 5. Each of the image formation portions 60B to 60D has the same structure as the image formation portion 60A.

The charging device 5 is a charging portion for electrostatically charging the surface of the photoconductor drum 3A uniformly at a predetermined potential, and may be a charger type as illustrated in FIG. 1, or other type such as a contact type with a roller or a brush.

The optical scanning device 1 includes semiconductor lasers corresponding to yellow, magenta, cyan, and black colors, reflection mirrors, and the like together with a single polygon mirror. The optical scanning device 1 deflects the laser beam of each color emitted from the semiconductor laser by the polygon mirror at a constant angular speed in the main scanning direction, and then deflects the laser beam by an f-θ lens at a constant speed, so as to lead the same to each of photoconductor drums 3A to 3D via the reflection mirror. As the optical scanning device 1, for example, it is possible to use an EL or LED write head having light emission elements arranged like an array.

In the image formation portion 60A, the yellow laser beam emitted from the optical scanning device 1 forms an electrostatic latent image on the surface of the photoconductor drum 3A. The developing device 2 visualizes the electrostatic latent image formed on the photoconductor drum 3A with yellow toner. The cleaner unit 4 collects toner remaining on the surface of the photoconductor drum 3A after primary transfer that will be described later. In the image formation portions 60B to 60D, magenta, cyan, black toner images are formed on the photoconductor drums 3B to 3D, respectively, in the same manner as in the image formation portion 60A.

The intermediate transfer belt unit 6 includes an intermediate transfer belt 61, a drive roller 62, a follower roller 63, and an intermediate transfer roller 64. Four intermediate transfer rollers 64 are disposed corresponding to yellow, magenta, cyan, and black colors.

The intermediate transfer belt 61 runs around the drive roller 62, the follower roller 63, and the intermediate transfer roller 64 in a tensioned state. When a drive roller 62 receives a rotational force from a drive source (not shown) so as to rotate, the intermediate transfer belt 61 runs along a loop-like moving path passing through the image formation portions 60A to 60D sequentially. The intermediate transfer roller 64 performs the primary transfer of the toner images on the surfaces of the photoconductor drums 3A to 3D to the intermediate transfer belt 61 by a transfer bias applied from a power supply portion (not shown).

In full color image formation, the toner images on the surfaces of the photoconductor drums 3A to 3D are transferred to the intermediate transfer belt 61 one by one in an overlaying manner, so that a color image is formed on the intermediate transfer belt 61 by subtractive color mixture.

The toner image transferred to the intermediate transfer belt 61 is led to between the drive roller 62 and the secondary transfer roller 10 when the intermediate transfer belt 61 turns, so that secondary transfer to a paper sheet is performed by the secondary transfer roller 10. After the secondary transfer, toner remaining on the intermediate transfer belt 61 is removed by the cleaning unit 65.

The paper feed cassette 81, which is disposed below the optical scanning device 1, houses sheets (recording sheets) that are used for the image formation. A manual feed tray 82, which is disposed on a side surface of the apparatus main body 110 in a turnable manner, holds sheets that are used for the image formation. The copy receiving tray 91, which is disposed above the image formation portions 60A to 60D, houses the sheet after image formation.

Inside the apparatus main body 110, there is formed a sheet transport path S from the paper feed cassette 81 and the manual feed tray 82 to the copy receiving tray 91 via between the intermediate transfer belt 62 and the transfer roller 10, and via the inside of the fixing unit 7. Pickup rollers 11A and 11B, conveyor rollers 12A to 12D, a registration roller 13, and the transfer roller 10 are disposed along the sheet transport path S.

The pickup rollers 11A and 11B are disposed in the vicinity of the paper feed cassette 81 and in the vicinity of the manual feed tray 82, respectively, so that the sheets can be fed one by one from the paper feed cassette 81 and the manual feed tray 82 to the sheet transport path S. The registration roller 13 temporarily holds the sheet that is being conveyed along the sheet transport path S, and then starts to rotate at a timing when the leading edge of the sheet meets the leading edge of the toner image on the intermediate transfer belt 62 between the intermediate transfer belt 62 and the secondary transfer roller 10.

The fixing unit 7 includes a heat roller 71 and a pressure roller 72. The heat roller 71 and the pressure roller 72 heat and press the sheet on which the toner image is secondarily transferred, so that the toner image is fixed to the sheet.

Figure 2:
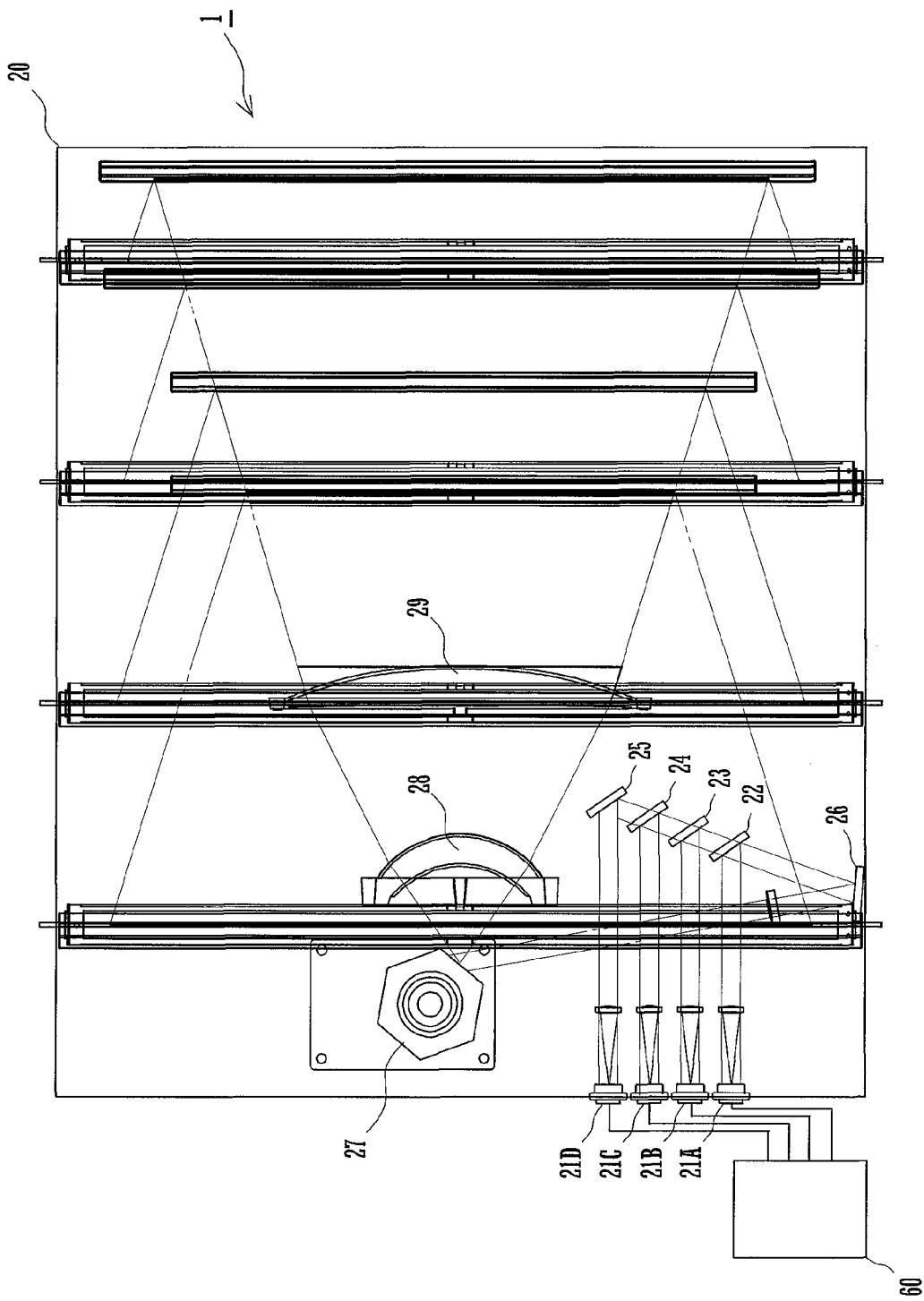
FIG. 2 is a plan view of the inside of an optical scanning device to which the present invention is applied.
Figure 3:
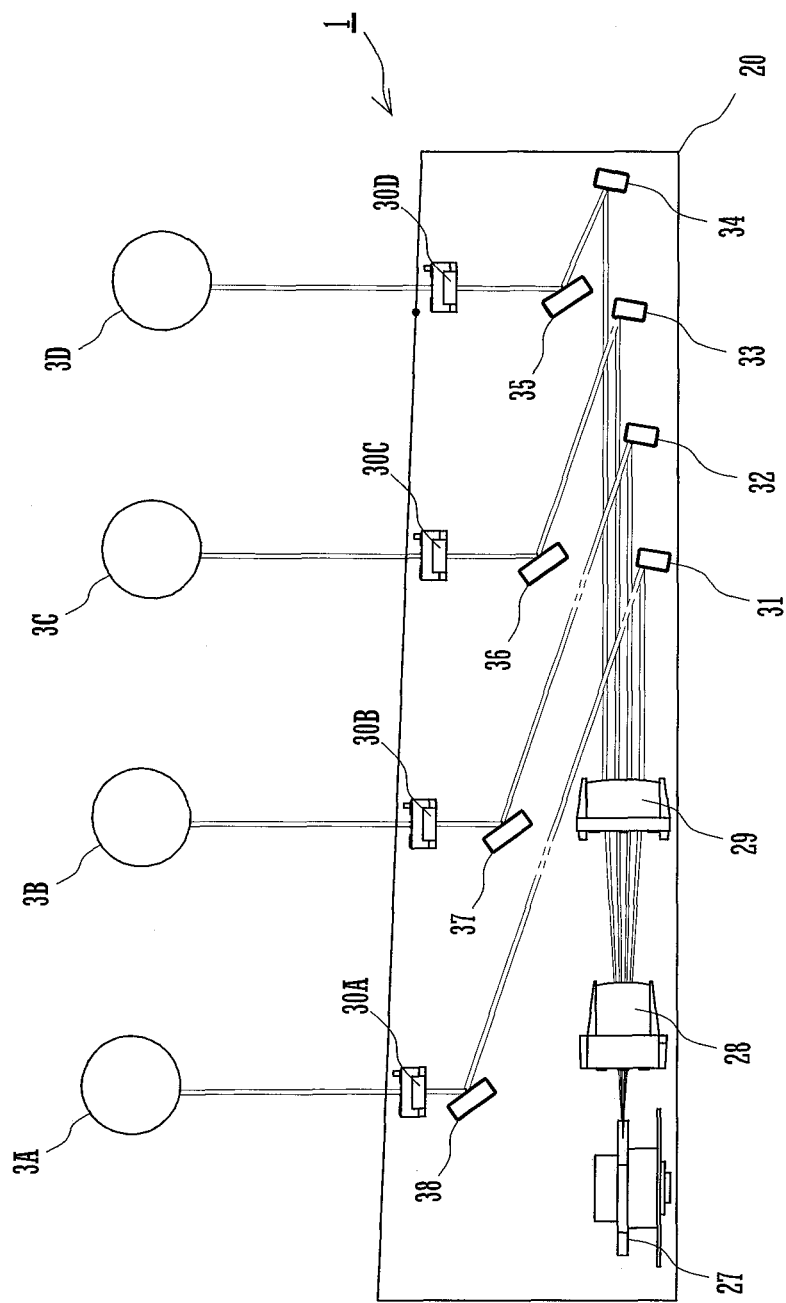
FIG. 3 is a front view of the inside of the optical scanning device.
Figure 4:
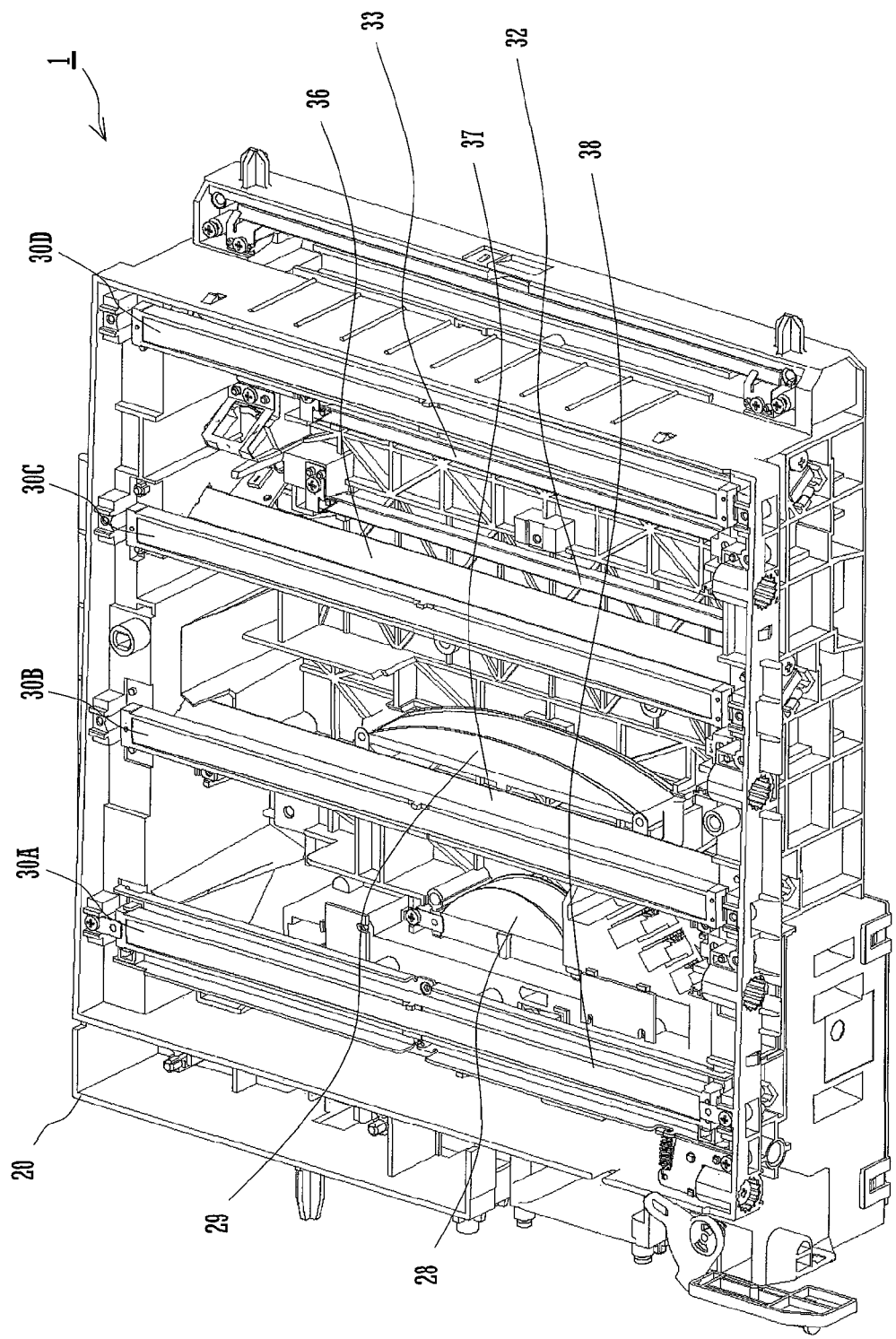
FIG. 4 is an external view of the optical scanning device in the state where the lid is opened.

As illustrated in FIGS. 2 to 4, the optical scanning device 1 houses laser diodes 21A to 21D, mirrors 22 to 26, a polygon mirror 27, first to third fθ lenses 28, 29, and 30A to 30D, and mirrors 31 to 38 in an enclosure 20 that is a molded part made of a thermoplastic resin material.

The laser diodes 21A to 21D correspond to the light sources in the present invention. The laser diodes 21A to 21D correspond to yellow, magenta, cyan, and black color, respectively, each of which emits the image light modulated by image data of each color.

The mirrors 22 to 25 deflect the image light beams emitted from the laser diodes 21A to 21D to the mirror 26. The mirror 26 deflects the image light beams deflected by the laser diodes 21A to 21D to the polygon mirror 27. The mirrors 22 to 26 are disposed between the polygon mirror 27 and the laser diodes 21A to 21D, respectively.

The polygon mirror 27 is the scanning portion in the present invention, which deflects the image light beams at a constant angular speed in the main scanning direction to perform the scanning. Therefore, the polygon mirror 27 has a plurality of reflective surfaces arranged along the perimeter and rotates at a constant speed in a predetermined direction.

The first fθ lens 28 and the second fθ lens 29 deflect the image light beam deflected at a constant angular speed by the polygon mirror 27, at a constant speed. The third fθ lenses 30A to 30D shape the image light beams and distribute the same to the photoconductor drums 3A to 3D outside the enclosure 20. The mirrors 31 to 38 lead the image light beams deflected by the first and second fθ lenses 28 and 29 to the third fθ lenses 30A to 30D, respectively.

In this way, inside the enclosure 20, there is formed a light path of the image light beams emitted from the laser diodes 21A to 21D.

Here, it is supposed that a part of the black image light is reflected by the third fθ lens 30D and then passes through the second fθ lens 29 and the first fθ lens 28 so as to enter the reflective surface of the polygon mirror 27, and as a result, reflection light thereof enters the yellow light path as stray light.

Figure 5:
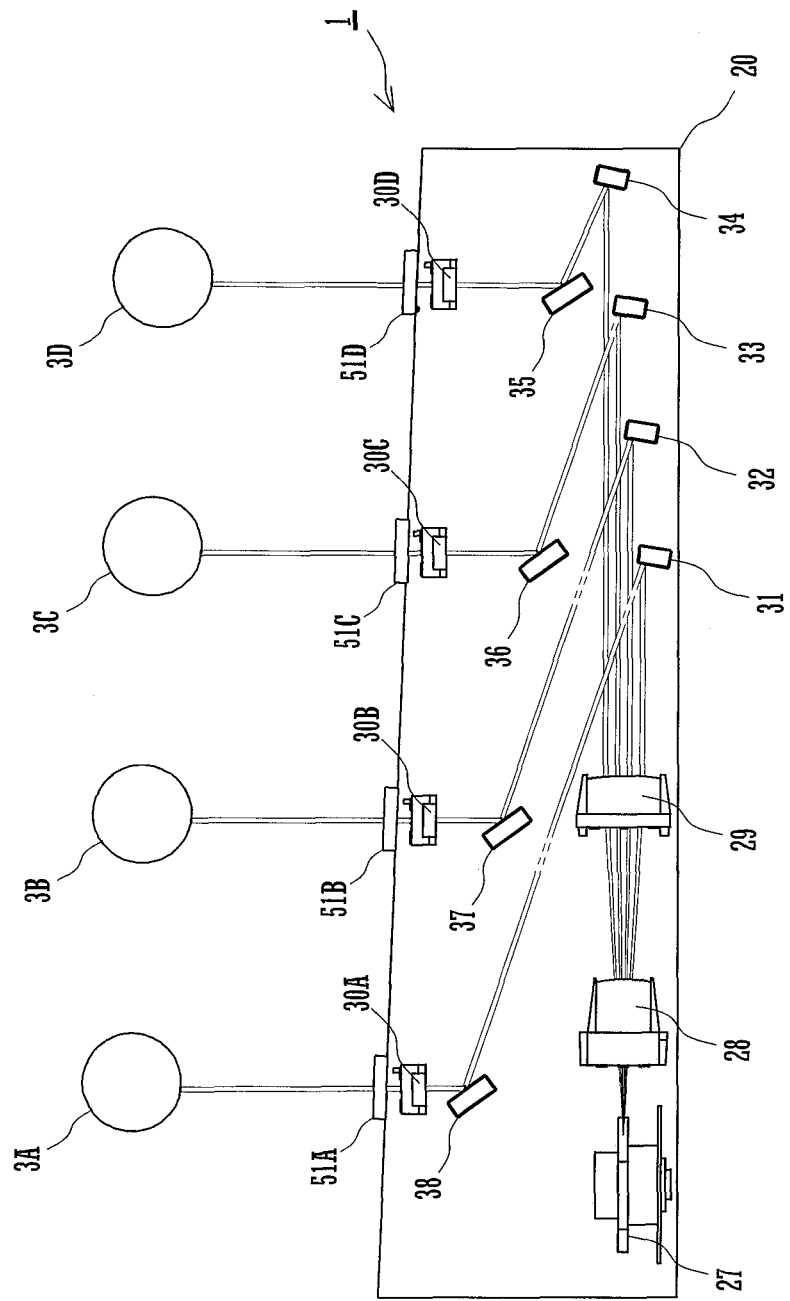
FIG. 5 is an internal front view of the optical scanning device according to a first embodiment of the present invention.

In the optical scanning device 1 according to the first embodiment of the present invention, as illustrated in FIG. 5, a dust-proofing glass 51A, which is disposed in a light path of the yellow image light, is made of glass having a light transmittance of 70 to 80%. Other dust-proofing glasses 51B, 51C, and 51D are made of glass having a light transmittance of approximately 92%. The dust-proofing glasses 51A to 51D cover the windows formed in the lid constituting the upper wall of the enclosure 20, so as to prevent dusts from entering the optical scanning device 1. The dust-proofing glass 51A is the light amount attenuation portion (transparent optical element) of the present invention, which has a light transmittance decreased by gluing a filter or applying a coating agent onto the surface of the same glass as that constituting the dust-proofing glasses 51B, 51C, and 51D, or by roughing the surface of the same glass.

As the filter to be glued, an ND filter can be used, for example. As the coating agent to be applied, an oxide such as $SiO_2$ or a fluoride such as $MgF_2$ can be used, for example. As the roughing process, a polishing process with abrasive containing coarse particles can be used, for example.

Figure 6:
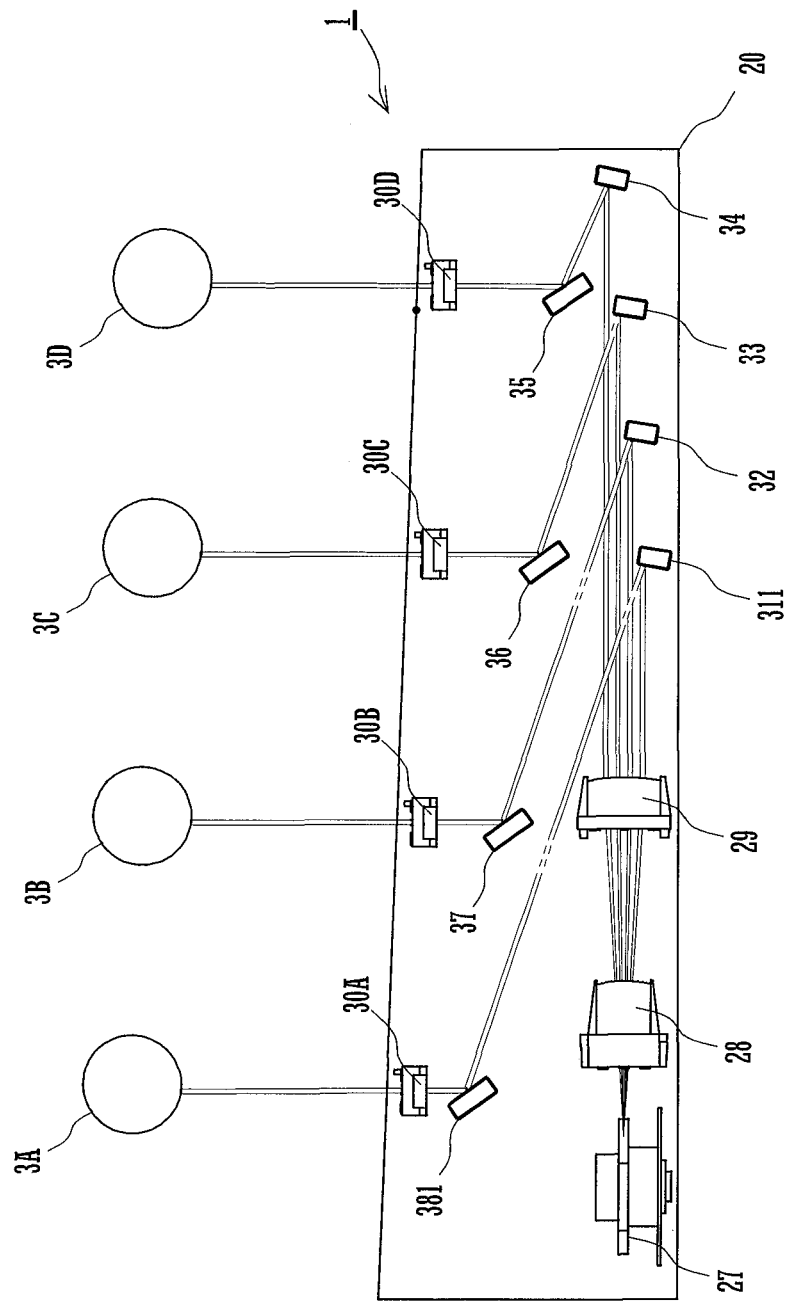
FIG. 6 is an internal front view of the optical scanning device according to a second embodiment of the present invention.

In the optical scanning device 1 according to the second embodiment of the present invention, as illustrated in FIG. 6, light reflectivity of a mirror 311 and/or a mirror 381 disposed in the light path of the yellow image light is set to 70 to 80% that is lower than light reflectivity of other mirrors 32 to 37 that is approximately 92%. In order to decrease light reflectivity of the mirrors 311 and 381, a time period of vapor deposition of reflective material is set to be shorter than that for other mirrors 32 to 37. Alternatively, it is also possible to decrease the light transmittance by gluing a filter or applying a coating agent to the surface, or by roughing the surface. The mirror 311 and/or mirror 381 correspond to the light amount attenuation portion (reflective optical element) of the present invention.

Figure 7:
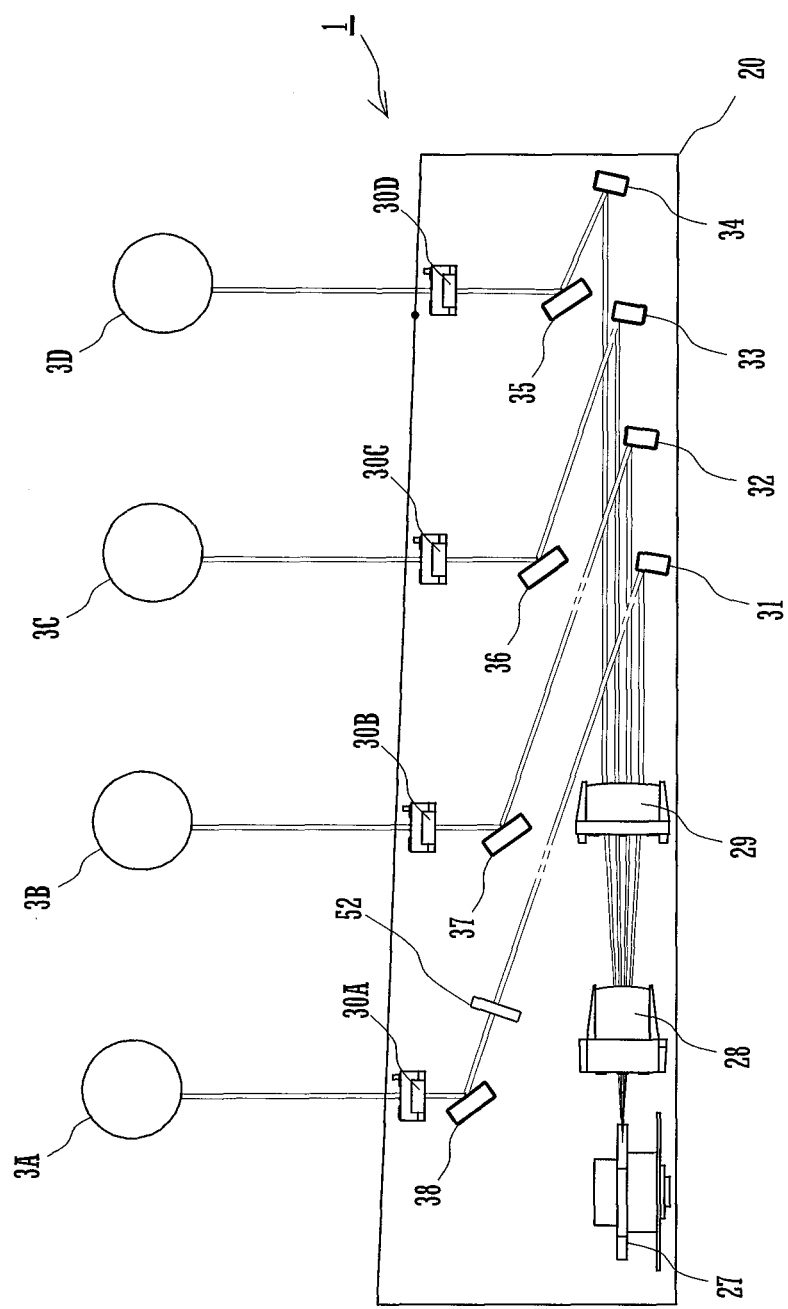
FIG. 7 is an internal front view of the optical scanning device according to a third embodiment of the present invention.

In the optical scanning device 1 according to the third embodiment of the present invention, as illustrated in FIG. 7, an ND filter 52 having a light transmittance of 70 to 80% is disposed in the downstream side of a position where black stray light enters in the light path of the yellow image light. The ND filter 52 is the light amount attenuation portion (transparent optical element) of the present invention.

Figure 8:
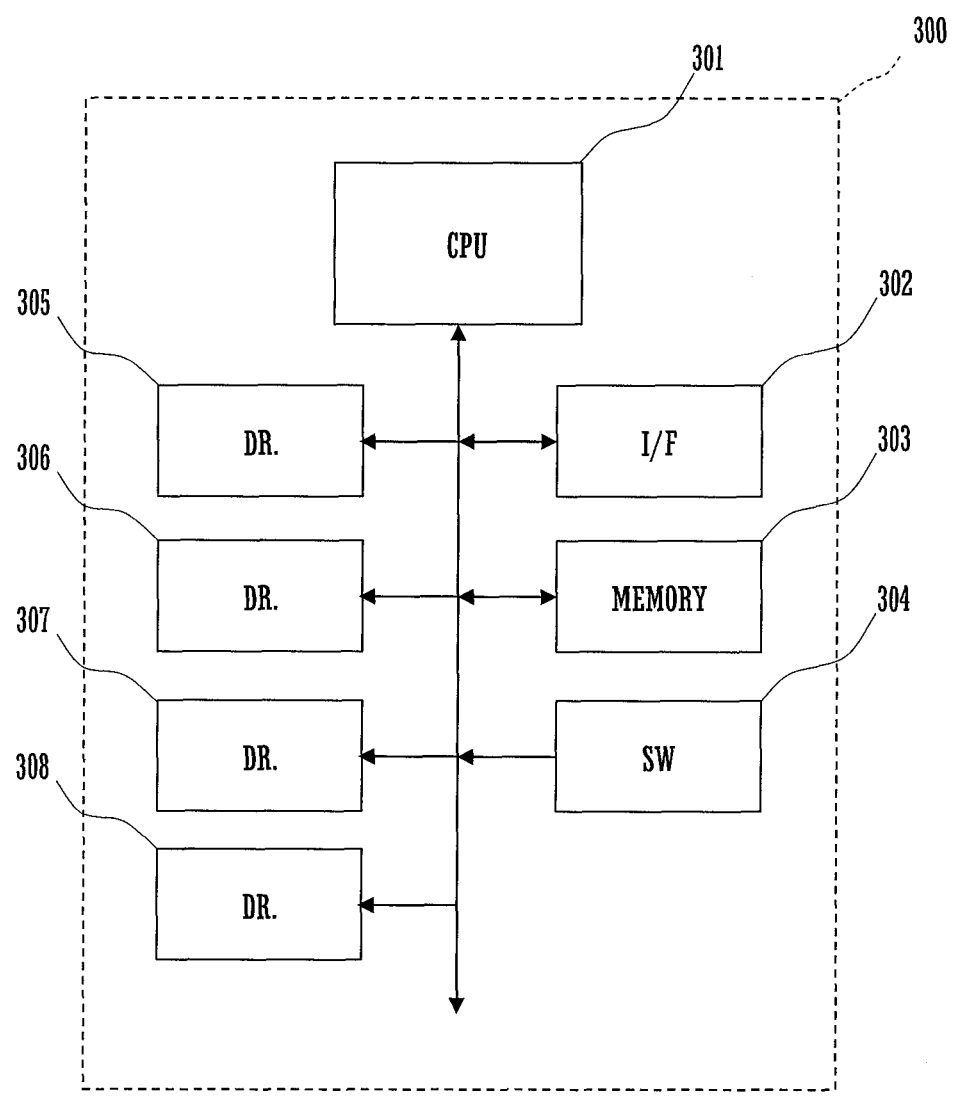
FIG. 8 is a block diagram of a control portion of the optical scanning device.

As illustrated in FIG. 8, the optical scanning device 1 includes a drive portion 300. The drive portion 300 includes a CPU 301, an interface 302, a memory 303, a switch 304, and drivers 305 to 308. The CPU 301 drives the laser diodes 21A to 21D via the drivers 305 to 308 based on image data of yellow, magenta, cyan, and black colors, respectively, which are input from a control portion 200 of the image forming apparatus 100 via the interface 302. The memory 303 stores corrected states of the laser diodes 21A to 21D. The switch 304 receives an input of instruction for light amount correction of the color among yellow, magenta, cyan, and black colors, in which light amount in the light path is attenuated by the light amount attenuation portion.

As described above, when the black stray light enters the yellow light path and the light amount attenuation portion is disposed in the yellow light path, a worker inputs the instruction for light amount correction for yellow color by operating the switch 304. In accordance with the operation of the switch 304, the CPU 301 stores information of the yellow laser diode 21A as a correction target in the memory 303. The CPU 301 refers to the information stored in the memory 303 when the laser diodes 21A to 21D are driven and outputs drive data to the driver 305 so that the light amount of the laser diode 21A is increased by a predetermined correction amount. This correction amount is an amount that compensates for light amount attenuated by the light amount attenuation portion.

Figure 9A:
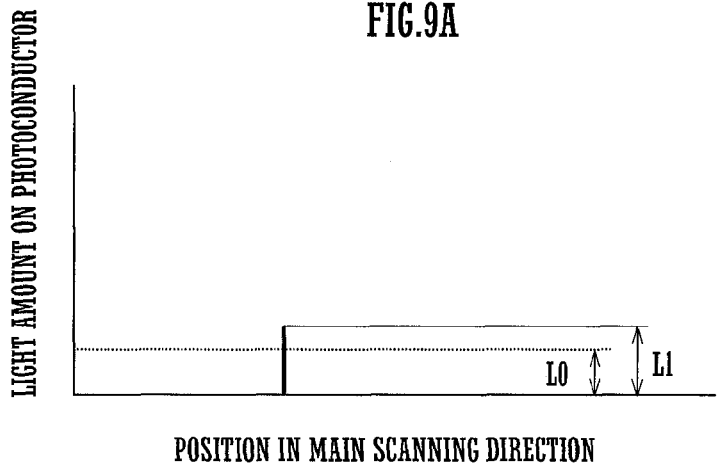
FIGS. 9A to 9C illustrate examples of a state of exposure to only stray light before attenuating light amount in the optical scanning device, a state of exposure to only stray light after attenuating light amount, and a state of exposure to image light and stray light, respectively.

FIG. 9A is a diagram illustrating a received light amount of the yellow photoconductor drum 3A when the yellow laser diode is not driven but the black laser diode is driven and black stray light enters the yellow light path. A light amount L0 indicates a lower limit value of the received light amount that can form an electrostatic latent image to be visualized (to be a toner image) on the photoconductor drum 3A.

In this case, because a light amount L1 of the black stray light exceeds the light amount L0, undesired exposure of the photoconductor is performed by the stray light so that an undesired black image is written on the photoconductor drum 3A.

Figure 9B:
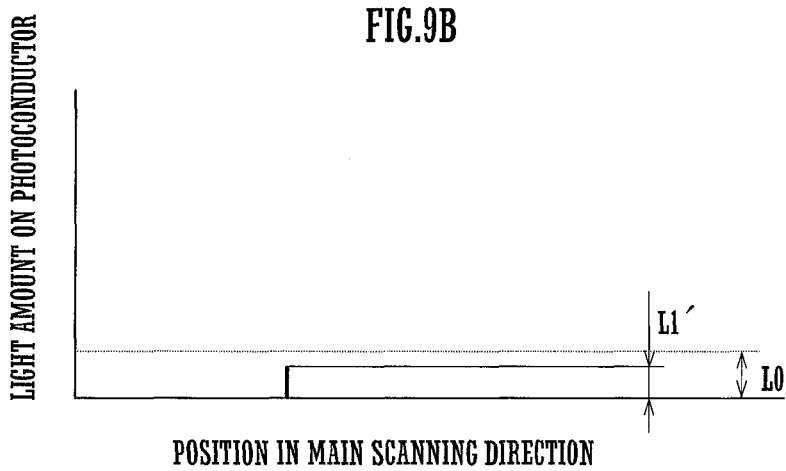

FIG. 9B is a diagram when the black stray light is attenuated by the light amount attenuation portion to be lower than the light amount L0. Thus, the undesired black image generated as illustrated in FIG. 9A is not written on the photoconductor drum 3A.

Figure 9C:
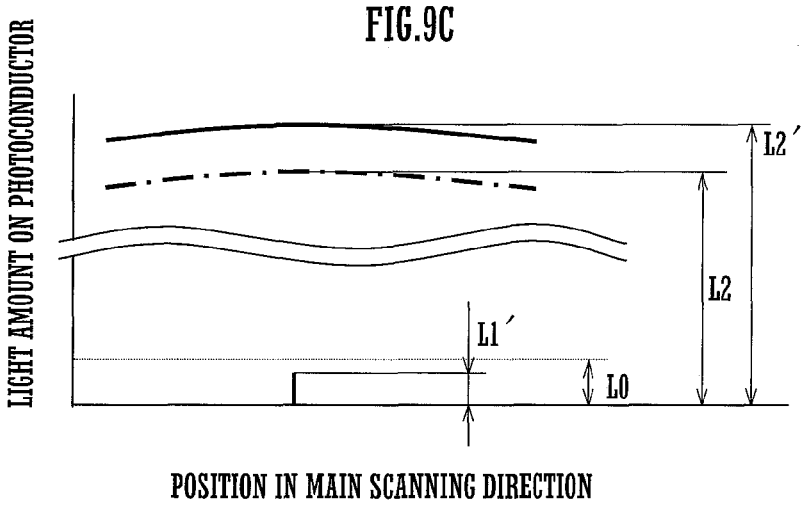

In FIG. 9C, a light amount L2 is a yellow light amount when the light amount attenuation portion is used. A light emission amount of the yellow laser diode 21A is controlled so that the received light amount of the photoconductor drum 3A becomes a light amount L2' corresponding to the attenuation by the light amount attenuation portion for a measure against stray light.

Because a light emission amount of the black laser diode 21D is not increased, the black stray light entering the photoconductor drum 3A remains to be a light amount L1'. Therefore, a light amount of the black stray light is negligible with respect to the yellow light amount (L2') and does not substantially affect the yellow image.

In this way, also in the case where stray light enters the yellow image light, a yellow latent image can be formed correctly on the photoconductor drum 3A without an influence of the stray light.

Further, because it is not necessary to specify the part where the stray light is generated or to adjust the part where the stray light is generated, the undesired exposure due to the stray light can be prevented easily and securely.

The above description of the embodiments is merely an example in all respects and should not be interpreted as limitations. The scope of the present invention is defined not by the embodiments described above but by the claims. Further, the scope of the present invention is intended to include all modifications within the equivalent meanings and scope of the claims.

What is claimed is:

1. An optical scanning device comprising:
an enclosure having a plurality of windows covered with transparent members;
a plurality of light sources housed in the enclosure;
a scanning portion for deflecting each of a plurality of light beams emitted from the plurality of light sources at a constant angular speed in a main scanning direction;
optical elements constituting respective light paths from the scanning portion to the windows for the plurality of light beams, respectively;
a light amount attenuation portion for attenuating light amount in a light path of a first light source among the plurality of light sources in a downstream side of a position where a light beam emitted from a second light source enters as stray light; and
a drive portion for driving the first light source so as to compensate for light amount attenuated by the light amount attenuation portion,
wherein the light amount attenuation portion is a transparent optical element that attenuates light transmittance in a downstream side of a position where the stray light enters in a light path of the first light source.

2. An optical scanning device according to claim 1, wherein the transparent optical element attenuates transmittance of the window included in the light path of the light beam emitted from the first light source among the plurality of windows.

3. An image forming apparatus comprising:
the optical scanning device according to claim 2; and
a plurality of photoconductors to be scanned by the light beams emitted from the plurality of light sources, respectively.

4. An image forming apparatus comprising:
the optical scanning device according to claim 1; and
a plurality of photoconductors to be scanned by the light beams emitted from the plurality of light sources, respectively.

* * * * *